H. C. WIRTZ & C. GEBHARDT, Jr.
Reciprocating Winnowers.

No. 145,077.  Patented Dec. 2, 1873.

UNITED STATES PATENT OFFICE.

HENRY C. WIRTZ AND CHARLES GEBHARDT, JR., OF NORTHFIELD, MINN.

IMPROVEMENT IN RECIPROCATING WINNOWERS.

Specification forming part of Letters Patent No. 145,077, dated December 2, 1873; application filed June 14, 1873.

*To all whom it may concern:*

Be it known that we, HENRY C. WIRTZ and CHAS. GEBHARDT, Jr., of Northfield, in the county of Rice and State of Minnesota, have jointly invented certain new and useful Improvements in Fanning - Mills; and we do hereby declare the following to be a full, clear, and exact description of the invention, such as will enable others skilled in the art to which it pertains to make and use it, reference being had to the accompanying drawings, which form part of this specification.

Figure 1:
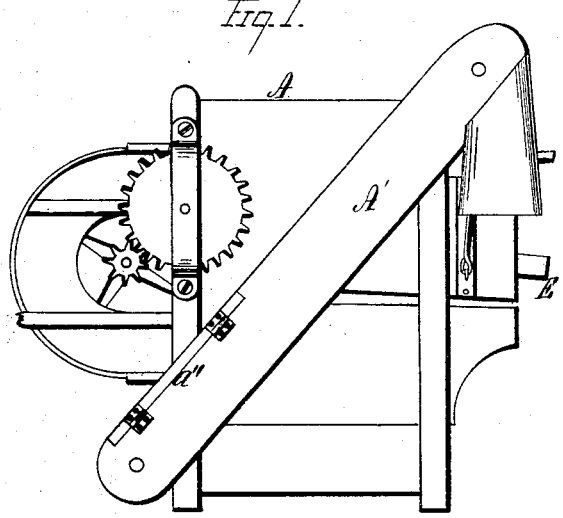
Figure 2:
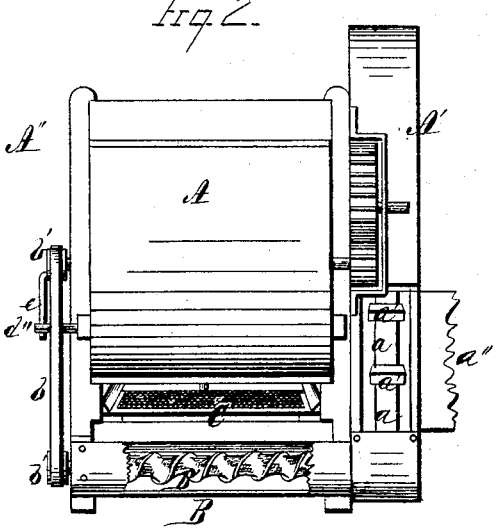
Figure 3:
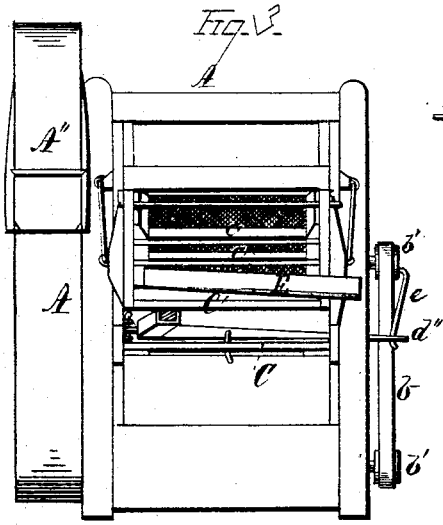
Figure 4:
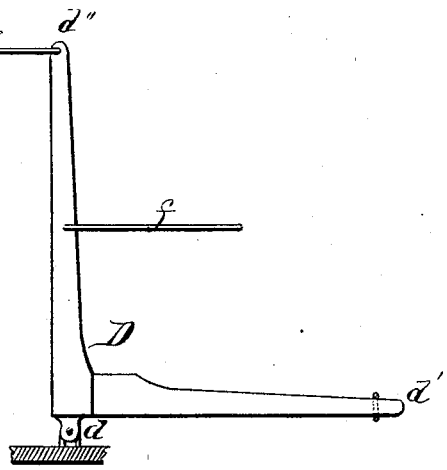

In the drawings, Figure 1 represents a side view of a fanning-mill, showing the grain-elevator; Fig. 2, a front view with the door of the grain-elevator open, to show the arrangement of the elevator-buckets; Fig. 3, an end view; Fig. 4, a detached view of the rectangular shaker, attached to the cross-bar of the screens and to the grain-board.

A represents a fanning-mill, provided with the usual fan and driving-gear, which operates the fan and screens. At the front lower portion of the machine A is placed a trough, B, with an endless screw or worm, B', placed therein. This screw or worm B' is operated by a band, $b$, on pulleys $b'$ $b'$ on its shaft and on the shaft of the fan. On the opposite end of this shaft of the screw B' is another pulley, around which passes the elevating-band $a$ with its buckets $a'$; or gearing may be used instead of this pulley and band, and an elevating-screw, similar to B', be used instead of the band and buckets. This band $a$ with its buckets $a'$ are inclosed within an elevated trough or box, A', extending to the top back part of the machine A, said trough curving over downward, and being open at its delivery-end, a suitable gate or door, A'', at this delivery-end being provided, by which to regulate the discharge of grain. The trough or elevator-box A' is provided with a hinged door, $a''$, Fig. 2, in the top of its lower portion, through the opening, in which to observe the action of the elevator-buckets. C represents the grain-board, which discharges its finished grain into the trough B. This grain-board C is operated by means of connections from the fan - axle with the arm D. This arm or shaker D is L-shaped or rectangular in form, (see Fig. 4,) pivoted at $d$ to the inside right-hand side of the machine, between the screens C' and the grain - board C, and connected, at the end $d'$, to the lower cross-bar of the screens C', and to the other end, $d''$, to the pulley $b'$ on the shaft of the fan, through which it receives motion by means of the rod $e$. To the arm $d''$ of this shaker D, at its center, is placed a rod, $f$, which is also attached to the grain-board C. The operation of this rectangular shaker D by these described connections is such that while it shakes the screens from side to side of the machine it shakes the grain-board from end to end, at right angles of the latter. At the lower front end of the screens C' is placed a trough, E, to receive and deposit in a receptacle all grain, chaff, &c., that may not have been blown off or passed through the different screens.

The operation of this machine is as follows: The grain to be fanned is placed in the hopper on top of the machine; the machine set in motion by means of the driving-crank, or by other suitable power, the grain, &c., falling upon the screens, the draft of wind from the fan, passing through the screens and grain thereon, separating the chaff and light particles of dirt, &c., from the grain, and blowing it out at the back of the machine, the rocking motion imparted to the screens agitating the grain, &c., carrying it from one screen to the other, the good heavy grain passing through all the screens onto the grain-board, which is inclined toward the elevator-trough. By the motion imparted to the inclined grain-board by the rectangular shaker, the grain is carried down to the horizontal trough, and by the worm on endless screw in this horizontal trough to the elevator. The tailings, screenings, dirt, &c., by the action of the draft from the fan, and by being agitated on the screens, being light, are discharged into the trough at the front of the screens, and from thence into any proper receptacle. Any bad small grain, chaff, &c., that might have passed through the screens, are blown off or shaken into a drawer on the under side of the machine, upon their reaching the grain-board, so that nothing reaches the elevator but the pure grain. Bags or other proper receptacles are placed at the discharging-end of the grain-elevator, to receive the grain, which is regulated in its flow by a gate or door.

Having thus described our invention, what we claim as new, and desire to secure by Letters Patent, is—

The shaker-bar D, having one arm connected directly with the lateral screens, and the other with the grain-board, said arm pivoted at its angle to the side of the mill, and operated by a yoke-bar, e, uniting the extremity of the lateral arm directly with an eccentric upon the fan-shaft.

In testimony that we claim the foregoing we have hereunto set our hands this 10th day of June, 1873.

HENRY C. WIRTZ.
     CHAS. GEBHARDT, JR.

Witnesses:
 T. H. STREETER,
 CHARLES GEBHARDT.